US 9,864,897 B2

(12) United States Patent
Ding et al.

(10) Patent No.: US 9,864,897 B2
(45) Date of Patent: Jan. 9, 2018

(54) SURFACE STRUCTURE IDENTIFICATION UNIT AND CIRCUIT, IDENTIFICATION METHOD AND ELECTRONICE DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Xiaochuan Chen, Beijing (CN); Yingming Liu, Beijing (CN); Shengji Yang, Beijing (CN); Wei Liu, Beijing (CN); Tao Ren, Beijing (CN); Weijie Zhao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/122,542

(22) PCT Filed: Jan. 22, 2016

(86) PCT No.: PCT/CN2016/071775
§ 371 (c)(1),
(2) Date: Aug. 30, 2016

(87) PCT Pub. No.: WO2017/036076
PCT Pub. Date: Mar. 9, 2017

(65) Prior Publication Data
US 2017/0270338 A1    Sep. 21, 2017

(30) Foreign Application Priority Data

Aug. 31, 2015 (CN) .......................... 2015 1 0548995

(51) Int. Cl.
*G06K 9/00* (2006.01)
(52) U.S. Cl.
CPC ................................. *G06K 9/0004* (2013.01)
(58) Field of Classification Search
CPC .................................................... G06K 9/0004
See application file for complete search history.

(56) References Cited

U.S. PATENT DOCUMENTS

2015/0009186 A1    1/2015  Landy
2017/0103248 A1*   4/2017  Yamamoto ........... G06K 9/0004

FOREIGN PATENT DOCUMENTS

CN         103353814 A      10/2013
CN         104778923 A       7/2015
                (Continued)

OTHER PUBLICATIONS

International Search Report dated May 5, 2016 issued in corresponding in International Application No. PCT/CN2016/071775 along with the English translation of the Written Opinion of the International Searching Authority.

*Primary Examiner* — Tony Ko
(74) *Attorney, Agent, or Firm* — Nath, Goldberg & Meyer; Joshua B. Goldberg (57) ABSTRACT

The present invention provides a surface structure identification unit including photoelectric sensing element, first and second signal input terminals, trace line, driving module, reset module and evaluation unit. The photoelectric sensing element is connected to the first signal input terminal, and the driving module. The reset module is configured to be connected to the driving module in a reset stage to reset the same. The control terminal of the driving module is configured to be connected to the second signal input terminal and the trace line in a charging stage and disconnected from the trace line in a detecting stage; the first terminal of the driving module is configured to be disconnected from the first signal (Continued)

input terminal in the charging stage and connected to the first signal input terminal in the detecting stage; and a second terminal of the driving module is connected to the trace line.

20 Claims, 2 Drawing Sheets

(56) References Cited

FOREIGN PATENT DOCUMENTS

| | | |
|---|---|---|
| CN | 105046247 A | 11/2015 |
| JP | H7-248873 A | 9/1995 |

* cited by examiner

Fig. 1

(Prior Art)

Fig. 2

(Prior Art)

SURFACE STRUCTURE IDENTIFICATION UNIT AND CIRCUIT, IDENTIFICATION METHOD AND ELECTRONICE DEVICE

This is a National Phase Application filed under 35 U.S.C. 371 as a national stage of PCT/CN2016/071775, filed Jan. 22, 2016, an application claiming the benefit of Chinese Application No. 201510548995.X, filed Aug. 31, 2015, the content of each of which is hereby incorporated by reference in its entirety.

TECHNICAL FIELD

The present invention relates to the field of surface structure identification, and particularly, relates to a surface structure identification unit, a surface structure identification circuit including the surface structure identification unit, a display device including the surface structure identification circuit and a fingerprint identification method for identifying fingerprints using the surface structure identification circuit.

BACKGROUND

Recently, electronic devices having biometric identification function have entered people's life and work, and among them, fingerprint identification technology has drawn much attention due to unique identity property of fingerprint.

Figure 1:
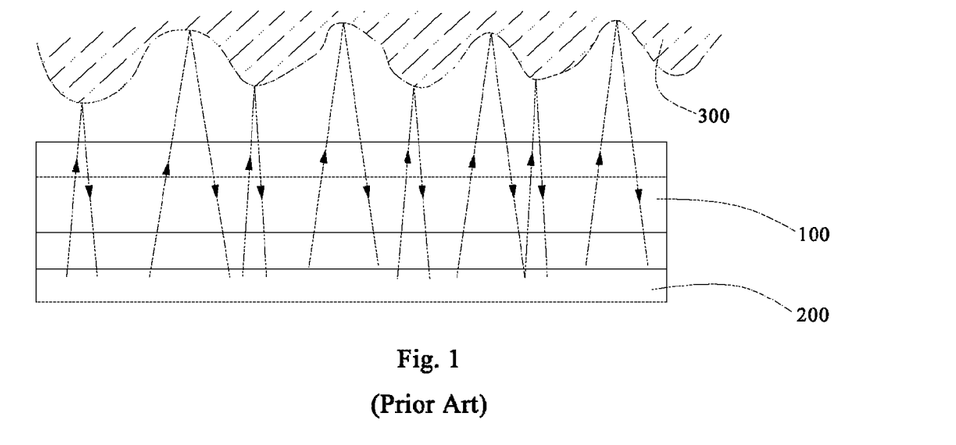
FIG. 1 is a schematic diagram illustrating principle of detecting fingerprints by using a surface structure identification circuit including photodiodes.

FIG. 1 is a schematic diagram illustrating principle of detecting fingerprints by using a surface structure identification circuit including photodiodes. As shown in FIG. 1, light emitted by a backlight source 200 passes through the surface structure identification circuit 100 including the photodiodes, reaches a finger surface 300 on the surface structure identification circuit 100, and is then reflected back to light receiving surfaces of the photodiodes from the finger surface 300, and the photodiodes generate currents according to the received light. Because ridges and valleys of fingerprint have different distances to the photodiodes, the current generated by the photodiode corresponding to a ridge of fingerprint is different from that generated by the photodiode corresponding to a valley of fingerprint. Therefore, fingerprint morphology can be determined based on magnitudes of the currents generated by the photodiodes in the surface structure identification circuit 100.

Figure 2:
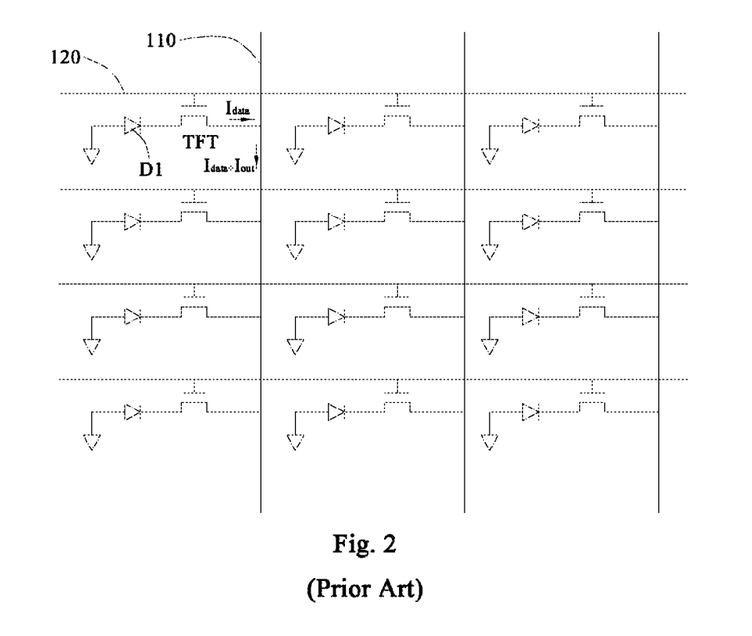
FIG. 2 is a schematic circuit diagram of a surface structure identification circuit in the prior art.

FIG. 2 is a circuit diagram of an existing surface structure identification circuit. As shown in FIG. 2, the surface structure identification circuit includes a plurality of scan lines 120 and a plurality of trace lines 110, which are provided in different layers and intersect with each other to define a plurality of surface structure identification units, in each of which a photoelectric sensing element D1 and a switching transistor TFT. In the process of identifying fingerprints, the plurality of scan lines 120 are scanned line by line, the photoelectric sensing element D1 is used for generating a detection current according to reflected light from the fingerprint, and then the fingerprint morphology is determined based on the magnitudes of the detection currents generated in the respective surface structure identification units.

However, when scanning one row of the surface structure identification units, a current $I_{out}$ generated from a first signal input terminal and a current $I_{data}$ generated by the photoelectric sensing element D1 are mixed together to be outputted, and $I_{data}$ is much smaller than $I_{out}$, thus, the current generated by the photoelectric sensing element D1 can hardly be distinguished from the mixed currents, which results in an error in fingerprint identification result.

Therefore, how to recognize the current generated by the photoelectric sensing element accurately becomes an urgent technical problem to be solved in the art.

SUMMARY

An object of the present invention is to provide a surface structure identification unit, a surface structure identification circuit including the surface structure identification unit, an electronic device including the surface structure identification circuit and a method for identifying a surface structure by using the surface structure identification circuit. By using the surface structure identification circuit to identify a surface structure such as fingerprints or the like, current generated by a photoelectric sensing element can be recognized accurately and morphology of the surface structure can be identified accurately.

To achieve the above object, as one aspect of the present invention, there is provided a surface structure identification unit, including a photoelectric sensing element, a first signal input terminal, a second signal input terminal, a trace line, a driving module, a reset module and an evaluation unit, wherein:

one terminal of the photoelectric sensing element is connected to the first signal input terminal, and the other terminal thereof is connected to a first terminal of the driving module;

the reset module is configured to be connected to a control terminal of the driving module only in a reset stage to reset potential of the control terminal of the driving module, so as to connect the first terminal of the driving module to a second terminal of the driving module;

the control terminal of the driving module is configured to be respectively connected to the second signal input terminal and the trace line in a charging stage following the reset stage to stabilize the control terminal of the driving module at a voltage capable of maintaining the connection between the first terminal and the second terminal of the driving module and disconnected from the trace line in a detecting stage, wherein the second signal input terminal is set to zero in the charging stage and is supplied with a voltage signal capable of causing the driving module to be in amplified state in the detecting stage; the first terminal of the driving module is configured to be disconnected from the first signal input terminal in the charging stage and connected to the first signal input terminal in the detecting stage; and the second terminal of the driving module is connected to the trace line; and the trace line is configured to be connected to the evaluation unit only in the detecting stage.

Preferably, the driving module includes a driving transistor, a gate of the driving transistor being formed to be the control terminal of the driving module, a first electrode of the driving transistor being formed to be the first terminal of the driving module, and a second electrode of the driving transistor being formed to be the second terminal of the driving module.

Preferably, the surface structure identification unit further includes a compensation module having a resistance, a first terminal of the compensation module being connected to the second signal input terminal, a second terminal of the compensation module being connected to the control terminal of the driving module.

Preferably, the resistance of the compensation module has the same value as that of an internal resistance of the trace line.

Preferably, the compensation module is a compensation resistor, which has a resistance having the same value as that of the internal resistance of the trace line.

Preferably, the surface structure identification unit further includes a switch control module configured to:

in the charging stage: control the control terminal of the driving module to be connected to the trace line, control the trace line to be disconnected from the evaluation unit, and control the first terminal of the driving module to be disconnected from the first signal input terminal; and in the detecting stage: control the control terminal of the driving module to be disconnected from the trace line, control the trace line to be connected to the evaluation unit, and control the first terminal of the driving module to be connected to the first signal input terminal.

Preferably, the switch control module includes a first switch transistor, a second switch transistor and a third switch transistor, wherein:

the first switch transistor has a gate connected to a scan line, a first electrode connected to the control terminal of the driving module, and a second electrode connected to the trace line, the scan line being able to supply an effective signal capable of turning on the first switch transistor to the gate of the first switch transistor in the charging stage;

the second switch transistor has a gate connected to a control line, a first electrode connected to the first signal input terminal, and a second electrode connected to the first terminal of the driving module, the control line being able to supply an effective signal capable of turning on the second switch transistor to the gate of the second switch transistor in the detecting stage; and the third switch transistor has a gate connected to a pulse signal input terminal, a first electrode connected to the trace line, and a second electrode connected to the evaluation unit, the pulse signal input terminal being able to supply an effective signal capable of turning on the third switch transistor to the gate of the third switch transistor in the detecting stage.

Preferably, the reset module includes a reset transistor and a reset signal input terminal, the reset transistor having a gate connected to the reset signal input terminal, a first electrode connected to the control terminal of the driving module, and a second electrode connected to the first signal input terminal, and the reset signal input terminal being able to supply an effective signal capable of turning on the reset transistor to the gate of the reset transistor in the reset stage.

As another aspect of the present invention, there is provided a surface structure identification circuit, including a plurality of surface structure identification areas arranged in a matrix, one surface structure identification unit being provided in each of the plurality of surface structure identification areas, and surface structure identification units in a same column corresponding to a same trace line, wherein the surface structure identification unit is the above surface structure identification unit provided by the present invention.

Preferably, the surface structure identification circuit further includes a plurality of switch line sets, each surface structure identification unit further includes a switch control module, the surface structure identification units in a same row correspond to a same switch line set, and said switch line set is connected to the switch control modules of the surface structure identification units in said row and supplies switch control signals to the switch control modules, such that:

in the charging stage: the switch control module controls the control terminal of the driving module to be connected to the trace line, controls the trace line to be disconnected from the evaluation unit, and controls the first terminal of the driving module to be disconnected from the first signal input terminal; and in the detecting stage: the switch control module controls the control terminal of the driving module to be disconnected from the trace line, controls the trace line to be connected to the evaluation unit, and controls the first terminal of the driving module to be connected to the first signal input terminal.

Preferably, each switch line set includes a scan line, a control line and a pulse signal line, and the switch control module includes a first switch transistor, a second switch transistor and a third switch transistor, wherein:

the first switch transistor has a gate connected to the scan line, a first electrode connected to the control terminal of the driving module, and a second electrode connected to the trace line;

the second switch transistor has a gate connected to the control line, a first electrode connected to the first signal input terminal, and a second electrode connected to the first terminal of the driving module; and the third switch transistor has a gate connected to a pulse signal input terminal, a first electrode connected to the trace line, and a second electrode connected to the evaluation unit, the pulse signal input terminal being connected to the pulse signal line, the pulse signal line being able to supply a voltage signal capable of turning on the third switch transistor to the gate of the third switch transistor in the detecting stage.

Preferably, each switch line set includes a reset signal line, the reset module of the surface structure identification unit is connected to the reset signal line, and the reset module is able to receive a reset signal via the reset signal line in the reset stage and reset the control terminal of the driving module.

Preferably, the reset module includes a reset transistor and a reset signal input terminal, the reset transistor having a gate connected to the reset signal input terminal, a first electrode connected to the control terminal of the driving module, and a second electrode connected to the first signal input terminal, and the reset signal input terminal being connected to the reset signal line.

Preferably, the evaluation unit includes a plurality of amplifier and filter modules and a plurality of analog to digital (A/D) converters, wherein each trace line is connected to one amplifier and filter module corresponding thereto, and each amplifier and filter module is connected to one A/D converter corresponding thereto.

As still another aspect of the present invention, there is provided an electronic device comprising a surface structure identification circuit, wherein the surface structure identification circuit is any one of the above surface structure identification circuits provided by the present invention.

As yet another aspect of the present invention, there is provided a method for identifying a surface structure using the above surface structure identification circuit, wherein the method includes a plurality of identification cycles, and each identification cycle includes:

a reset stage: using the reset module to reset the control terminal of the driving module;

a charging stage: controlling the first terminal of the driving module to be disconnected from the first signal input terminal, controlling the second signal input terminal to be set to zero, controlling the control terminal of the driving module to be connected to the trace line such that the control terminal of the driving module is stabilized at a voltage capable of maintaining connection between the first terminal and the second terminal of the driving module, and controlling the trace line to be disconnected from the evaluation unit;

a detecting stage: controlling the trace line to be connected to the evaluation unit, controlling the first terminal of the driving module to be connected to the first signal input terminal; and controlling a signal of the second signal input terminal to cause the driving module to be in amplified state; and a calculating stage: determining morphology of the surface structure based on a current received in the detecting stage by the evaluation unit.

In the surface structure identification unit provided by the present invention, the current generated by the photoelectric sensing element can be obtained by introducing the charging stage, so that the current generated by the photoelectric sensing element under the influence of the surface structure can be conveniently identified in the detecting stage. Thus, the morphology of the surface structure covering on the surface structure identification unit can be obtained more accurately.

BRIEF DESCRIPTION OF THE DRAWINGS

Accompanying drawings are used for providing a further understanding of the present invention, constitute a part of the specification, and are used for explaining the present invention together with the following specific implementations, rather than limiting the present invention. In the drawings.

DETAILED DESCRIPTION

The specific implementations of the present invention will be described in detail below in conjunction with the accompanying drawings. It should be understood that the specific implementations described herein are merely for describing and explaining the present invention, rather than limiting the present invention.

Figure 3:
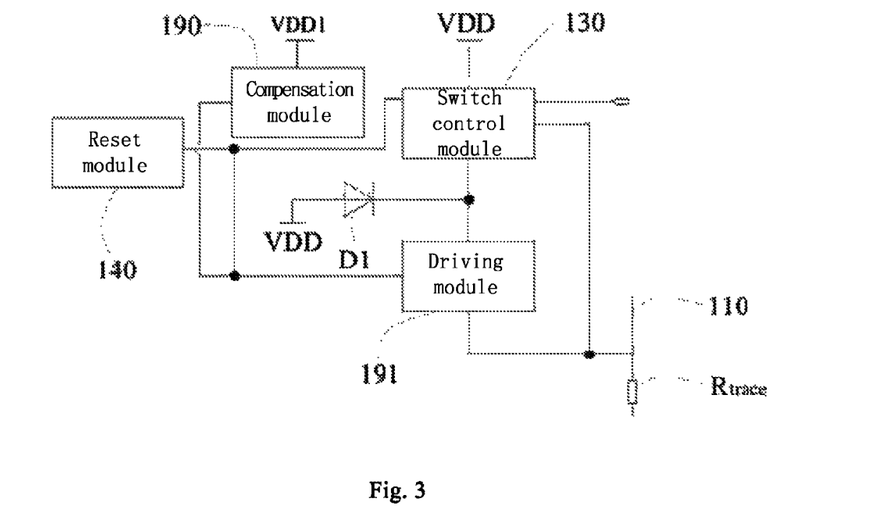
FIG. 3 is a schematic diagram illustrating modules of a surface structure identification unit provided by the present invention.

As one aspect of the present invention, there is provided a surface structure identification unit, as shown in FIG. 3, the surface structure identification unit includes a photoelectric sensing element D1, a first signal input terminal VDD, a second signal input terminal VDD1, a driving module 191, a trace line 110, a reset module 140 and an evaluation unit (not shown). One terminal of the photoelectric sensing element D1 is connected to the first signal input terminal VDD, and the other terminal thereof is connected to a first terminal of the driving module 191.

The reset module 140 is configured to be connected to a control terminal of the driving module 191 only in a reset stage to reset potential of the control terminal of the driving module 191, so that the potential of the control terminal of the driving module 191 enables the first terminal of the driving module 191 to be connected to a second terminal thereof. It can be understood that, in a charging stage and a detecting stage following the reset stage, the reset module 140 is disconnected from the control terminal of the driving module 191.

The second terminal of the driving module 191 is connected to the trace line 110. The first terminal of the driving module 191 is configured to be disconnected from the first signal input terminal VDD in the charging stage and be connected to the first signal input terminal VDD in the detecting stage. The control terminal of the driving module 191 is configured to be respectively connected to the second signal input terminal VDD1 and the trace line 110 in the charging stage so that the control terminal of the driving module 191 is stabilized at a voltage capable of maintaining the connection between the first terminal and the second terminal of the driving module 191, and be disconnected from the trace line 110 in the detecting stage, wherein the second signal input terminal VDD1 is set to zero in the charging stage and is supplied with a voltage signal that can make the driving module 191 in amplified state. The voltage signal supplied to the second signal input terminal VDD1 in the detecting stage is not specifically limited in the present invention, as long as it can make the driving module 191 operate in the amplified state in the case that the first terminal of the driving module 191 is connected to the first signal input terminal VDD. In one embodiment, the signal supplied to the second signal input terminal VDD1 in the detecting stage may be the same as that supplied to the first signal input terminal. For example, the second signal input terminal VDD1 may be a pulse signal input terminal, and a pulse signal is supplied to the second signal input terminal VDD1 such that the second signal input terminal VDD1 is set to zero in the charging stage and is supplied with the same signal as that supplied to the first signal input terminal VDD in the detecting stage.

The trace line 100 is configured to be connected to the evaluation unit only in the detecting stage.

In one embodiment, in the reset stage, the reset module is connected to the control terminal of the driving module 191 to reset the control terminal of the driving module 191, so that the potential of the control terminal of the driving module 191 enables a connection between the first terminal and the second terminal of the driving module 191. In the charging stage, the first terminal of the driving module 191 is disconnected from the first signal input terminal VDD, the control terminal of the driving module 191 is connected to the trace line 110, the second signal input terminal VDD1 connected to the control terminal of the driving module 191 is set to zero, and the trace line 110 is disconnected from the evaluation unit. In the detecting stage, the trace line 110 is connected to the evaluation unit, the first terminal of the driving module 191 is connected with the first signal input terminal VDD, and a voltage signal is inputted to the second signal input terminal VDD1 to make the driving module 191 operate in amplified state.

In the present invention, the trace line 110 is used for outputting a current generated by the surface structure identification unit. The evaluation unit is used for receiving the current outputted from the trace line 110 and is able to calculate specific morphology of a surface structure covering on the surface structure identification unit based on the received current.

In the present invention, in the charging stage, the reset module 140 is disconnected from the control terminal of the driving module 191, at this point, the control terminal of the driving module 191 is still at a floating voltage that enables the connection of the first terminal to the second terminal of the driving module 191, thus, the driving module 191 is in on state, and there is a current flowing through the driving module 191. Since the first terminal of the driving module 191 is disconnected from the first signal input terminal VDD, the current flowing through the driving module 191 is the current generated by the photoelectric sensing element D1. It can be understood that, even though the control terminal of the driving module 191 is connected to the second signal input terminal VDD1 that is set to zero, voltage of the control terminal of the driving module 191 will not drop to zero immediately because of the internal resistance of the lead connected between the control terminal of the driving module 191 and the second signal input terminal VDD1. In the meanwhile, as the current flowing through the driving module 191 charges the control terminal of the driving module 191, the control terminal of the driving module 191 can ultimately be stabilized at a voltage Vg that enables the connection of the first terminal with the second terminal of the driving module 191, and the voltage Vg is correlated with the current flowing through the driving module 191, so that the control terminal of the driving module 191 can collect the current generated by the photoelectric sensing element D1.

In other words, when the driving module 191 is turned on, the first signal input terminal VDD, the photoelectric sensing element D1, the driving module 191, the trace line 110 and the second signal input terminal VDD1 form a series circuit. At this time, the voltage Vg of the control terminal of the driving module 191 is correlated with the current generated, due to photoelectric effect, by the photoelectric sensing element D1, and magnitude of the current generated by the photoelectric sensing element D1 depends on the morphology of the surface structure covering on the surface structure identification unit.

In the detecting stage, the trace line 110 is connected to the evaluation unit, the first terminal of the driving module 191 is connected to the first signal input terminal VDD, the control terminal of the driving module 191 is connected to the second signal input terminal VDD1 so that the driving module 191 works in amplified state, and therefore the driving module 191 is equivalent to an amplifier module. The current generated by the amplifier module is correlated with the voltage Vg of the control terminal of the driving module 191 in the charging stage. Because the voltage generated by the charges charged into the control terminal of the driving module 191 is correlated with the current generated in the charging stage by the photoelectric sensing element D1, the current outputted via the trace line 110 is correlated with the current generated in the charging stage by the photoelectric sensing element D1. It can be understood that, the current outputted via the trace line 110 is also correlated with the voltage inputted to the first signal input terminal VDD and the internal resistance $R_{trace}$ of the trace line 110. The current outputted from the trace line 110 is outputted to the evaluation unit, therefore, the current generated by the photoelectric sensing element D1 in the charging stage can be obtained by the evaluation unit, and then the morphology of the surface structure covering on the surface structure identification unit can be calculated based on the obtained current.

It can be known from the above description, in the surface structure identification unit provided by the present invention, the voltage of the control terminal of the driving module 191 is reset at the reset stage, so that the control terminal of the driving module 191 can obtain, in the charging stage, a voltage correlated with the current generated by the photoelectric sensing element D1, as a result, the current generated by the photoelectric sensing element D1 under the influence of the surface structure can be conveniently identified in the detecting stage, and the morphology of the surface structure covering on the surface structure identification unit can thus be obtained more accurately.

In the present invention, the specific structure of the driving module 191 is not particularly limited, and in one example, the driving module 191 may include a driving transistor, which has a gate formed to be the control terminal of the driving module 191, a first electrode formed to be the first terminal of the driving module 191 and a second electrode formed to be the second terminal of the driving module 191.

Because the driving transistor has a multi-layer structure, and the gate of the driving transistor is in a different layer from the source and drain of the driving transistor, parasitic capacitance may be formed in the driving transistor and used for storing charges in the charging stage. The gate and first electrode of the driving transistor are connected with the first signal input terminal VDD and the second signal input terminal VDD1, respectively, and the second signal input terminal VDD1 is supplied with a certain voltage signal such that the driving transistor works in amplified region. In this case, the current generated in the detecting stage by the driving transistor can be obtained by detection, then the current generated by the photoelectric sensing element D1 under the influence of the surface structure can be obtained based on the obtained value and a calculation formula, and thus the morphology of the surface structure can be obtained.

It should be noted that the surface structure identification unit provided by the present invention can be used to identify various surface structures such as fingerprints, lip lines, or other surface structure. In the present invention, the signal inputted via the first signal input terminal VDD may be a high-level voltage signal.

It can be easily understood that, the surface structure identification unit provided by the present invention is used in a surface structure identification circuit. The surface structure identification circuit includes a plurality of surface structure identification units arranged in a matrix, and the surface structure identification units in a same column are connected to a same trace line 110 (i.e., the surface structure identification units in a same column correspond to a same trace line 110). In the process of identifying a surface structure, the surface structure identification units are scanned line by line. When scanning one row of surface structure identification units, the driving modules of the surface structure identification units in the other rows are disconnected from the first signal input terminal VDD. However, this disconnection is not an absolute disconnection, a leakage current $I_{leak}$ may still be generated and outputted to the trace line 110, thereby influencing the detection result. In order to eliminate the influence of the leakage current $I_{leak}$ to obtain the morphology of the surface structure more accurately, preferably, the surface structure identification unit may further include a compensation module 190 having a resistance. The compensation module 190 is connected between the control terminal of the driving module 191 and the second signal input terminal VDD1, specifically, a first terminal of the compensation module 190 is connected to the second signal input terminal VDD1, and a second terminal of the compensation module 190 is connected to the control terminal of the driving module 191.

It should be noted that, the compensation module 190 having a resistance described herein means that the compensation module 190 has a resistance value not equal to zero. For convenience of description, the resistance value of the compensation module 190 may be represented by $R_{st}$. In the present invention, the driving module 191 (e.g., driving transistor) may be an amplifier element, so as to control an output current $I_{out}$ by using a relatively small control current.

With the presence of the compensation module 190, the charging stage may be referred to as a charging and compensating stage. In this stage, the control terminal of the driving module 191 is disconnected from the reset module 140, but still at a floating voltage capable of turning on the driving module 191, the compensation module 190 is connected with the trace line 110, the trace line 110 is disconnected from the evaluation unit, the first terminal of the driving module 191 is disconnected from the first signal input terminal VDD, the first terminal of the compensation module 190 is connected with the second signal input terminal VDD1, the second terminal of the compensation module 190 is connected with the control terminal of the driving module 191 (i.e., gate of the driving transistor), and therefore, both the leakage current $I_{leak}$ leaked onto the trace line 110 and the current $I_{data}$ generated by the photoelectric sensing element D1 charges the control terminal of the driving module (i.e., the parasitic capacitance of the driving transistor), so that the voltage of the control terminal of the driving module 191 is stabilized at Vg ultimately. The voltage Vg of the control terminal of the driving module 191 can be calculated according to the following formula (1):

$$Vg = (I_{data} + I_{leak})R_{st} \quad (1)$$

In the detecting stage, the compensation module 190 is disconnected from the trace line 110, the trace line 110 is connected with the evaluation unit, the first terminal of the driving module 191 is controlled to be connected with the high-level input terminal VDD, and in the case that the driving module 191 is a driving transistor, the current $I_{out}$ outputted to the evaluation unit via the trace line 110 can be calculated using the formula (2).

$$\begin{aligned} I_{out} &= K/2 \; (VDD - Vg - V_{th} + I_{leak} * R_{trace}) \quad (2) \\ &= K/2 \; (VDD - (I_{data} + I_{leak})R_{st} - V_{th} + I_{leak} * R_{trace}) \\ &= K/2 \; (VDD - I_{data} * R_{st} - I_{leak} * R_{st} - V_{th} + I_{leak} * R_{trace}) \\ &= K/2 \; [VDD - I_{data} * R_{st} - I_{leak} * (R_{st} - R_{trace}) - V_{th}] \end{aligned}$$

where,
$V_{th}$ is the threshold voltage of the driving transistor;
$R_{trace}$ is the internal resistance of the trace line 110;
$R_{st}$ is the internal resistance of the compensation module 190; and
K is a constant correlated with width-to-length ratio of the driving transistor.

It can be known from the part "$I_{leak}*(R_{st}-R_{trace})$" in the formula (2), the resistance of the compensation module 190 counteracts a part of the internal resistance of the trace line 110, so as to reduce influence of the leakage current $I_{leak}$ on the current $I_{out}$ ultimately outputted to the evaluation unit, thereby improving accuracy of detection of the surface structure.

In the present invention, the value of the resistance of the compensation module 190 is not particularly limited, as long as it can counteracts the internal resistance of the trace line 110 such that the difference between the value of the resistance of the compensation module 190 and the value of the internal resistance of the trace line 110 is smaller than the value of the internal resistance of the trace line 110.

In order to eliminate the influence of the leakage current $I_{leak}$ on the current $I_{out}$ ultimately outputted to the evaluation unit via the trace line 110, preferably, the resistance of the compensation module 190 has the same value as that of the internal resistance of the trace line 110 connected to the surface structure identification unit, and accordingly the formula (2) can be rewritten as: $I_{out}=K/2[VDD-I_{data}*R_{st}-V_{th}]$. It can be thus known that the current $I_{out}$ ultimately outputted via the trace line 110 is correlated with the resistance value $R_{st}$ of the compensation module, the threshold voltage $V_{th}$ of the driving transistor and properties of the driving transistor itself only, but irrelevant to the leakage current $I_{leak}$, thereby further improving identification accuracy of the surface structure identification unit.

It should be noted that, in the detecting stage, the current generated by the photoelectric sensing element D1 is much smaller than that generated by the driving module 191, and therefore, the current $I_{data}$ generated by the photoelectric sensing element D1 can be left out in calculating the current $I_{out}$ ultimately outputted to the evaluation unit via the trace line 110. However, in the charging stage, the generated current only includes the current generated by the photoelectric sensing element D1 and the leakage currents generated by the surface structure identification units in the other rows, and therefore, the current $I_{data}$ generated by the photoelectric sensing element D1 should not be left out in the charging stage.

Because the magnitude of the current $I_{data}$ generated by the photoelectric sensing element D1 is correlated with the intensity of light received by the photoelectric sensing element D1, i.e., correlated with the morphology of the surface structure covering on the surface structure identification unit, the morphology of the surface structure covering on the surface structure identification unit can be obtained by calculating the magnitude of the current $I_{data}$ generated by the photoelectric sensing element D1. As the current $I_{out}$ outputted via the trace line 110 can be obtained by detection, the magnitude of the current $I_{data}$ generated by the photoelectric sensing element D1 can be calculated using the formula (2), and then the morphology of the surface structure covering on the surface structure identification unit is obtained.

It can also be seen from the formula (2), current outputted by the surface structure identification unit including the compensation module 190 is less affected by the leakage current $I_{leak}$, therefore, the current $I_{data}$ generated by the photoelectric sensing element D1, which is obtained by calculation, is less affected by the leakage current $I_{leak}$, that is to say, the morphology of the surface structure obtained using the surface structure identification unit including the compensation module 190 is less affected by the leakage current, and thus the identification result is more accurate.

In the case of using the surface structure identification unit provided by the present invention to identify a surface structure, each identification cycle includes the reset stage, the charging stage (or the charging and compensating stage) and the detecting stage.

In order to simplify the structure of the surface structure identification unit, the compensation module 190 may be a compensation resistor, which has the same resistance value as the value of the internal resistance of the trace line 110 connected to the surface structure identification unit. Specifically, the compensation resistor is connected between the control terminal of the driving module 191 and the second signal input terminal VDD1, i.e., a first terminal of the compensation resistor is connected to the second signal input terminal VDD1 and a second terminal thereof is connected to the control terminal of the driving module 191.

For ease of control, preferably, the surface structure identification unit further includes a switch control module 130. The switch control module 130 is configured to:

in the charging and compensating stage: control the control terminal of the driving module 191 (the compensation module 190) to be connected with the trace line 110, control the trace line 110 to be disconnected from the evaluation unit, and control the first terminal of the driving module 191 to be disconnected from the first signal input terminal VDD; and in the detecting stage: control the control terminal of the driving module 191 to be disconnected from the trace line 110, control the trace line 110 to be connected to the evaluation unit, and control the first terminal of the driving module 191 to be connected with the first signal input terminal VDD.

Figure 4:
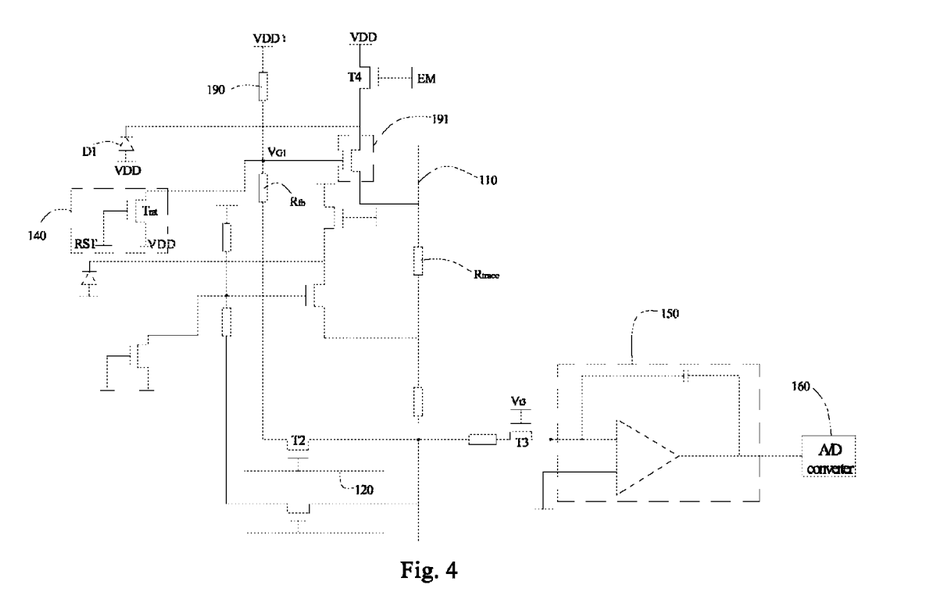
FIG. 4 is a schematic circuit diagram of a surface structure identification circuit provided by the present invention.

In the present invention, the specific structure of the switch control module is not particularly limited, as long as it can control states of the respective elements according to the above timing sequence. As a specific implementation of the present invention, as shown in FIG. 4, the switch control module may include a first switch transistor T2, a second switch transistor T4 and a third switch transistor T3.

The first switch transistor T2 may have a gate connected to one scan line 120, a first electrode connected to the control terminal of the driving module 191 (i.e., the second terminal of the compensation module 190) and a second electrode connected to the trace line 110.

In the charging stage, a scan signal is supplied to the gate of the first switch transistor T2 via the scan line 120 to turn on the first switch transistor T2 in the charging stage; in a stage other than the charging stage, no scan signal is supplied onto the scan line 20, and accordingly the first switch transistor T2 is turned off.

The second switch transistor T4 has a gate connected to a control line EM, a first electrode connected to the first signal input terminal VDD, and a second electrode connected to the first terminal of the driving module 191.

In the detecting stage, a turn-on signal is supplied to the second switch transistor T4 via the control line EM to turn on the second switch transistor T4; in a stage other than the detecting stage, no turn-on signal is supplied to the control line EM, and accordingly the second switch transistor T4 is turned off.

The third switch transistor T3 has a gate connected to a pulse signal input terminal $V_{t3}$, a first electrode connected to the trace line 110, and a second electrode connected to the evaluation unit, and the pulse signal input terminal $V_{t3}$ can supply a voltage signal capable of turning on the third switch transistor T3 to the gate of the third switch transistor T3 in the detecting stage.

In the detecting stage, the pulse signal input terminal $V_{t3}$ supplies a voltage signal capable of turning on the third switch transistor T3 to the third switch transistor T3, and thus the third switch transistor T3 is turned on; in a stage other than the detecting stage, the pulse signal input terminal $V_{t3}$ stop the supply of the voltage signal capable of turning on the third switch transistor T3 to the third switch transistor T3, and accordingly the third switch transistor T3 is turned off.

In order to eliminate the influence of residual charges in a previous scan cycle, the reset module 140 of the surface structure identification unit provided by the present invention is connected to the control terminal of the driving module 191 and used for resetting the potential of the driving module 191 in the reset stage. In this case, when the surface structure identification unit provided by the embodiment is used to identify a surface structure such as fingerprints, each identification cycle includes three stages, namely, the reset stage, the charging stage and the detecting stage.

In the present invention, the specific structure of the reset module 140 is not particularly limited, as long as it can reset the control terminal of the driving module 191 in the reset stage such that the control terminal of the driving module 191 enables the first terminal and the second terminal of the driving module 191 to be connected. In the implementation shown in FIG. 4, the reset module 140 includes a reset transistor $T_{rst}$ and a reset signal input terminal RST. The reset transistor $T_{rst}$ has a gate connected to the reset signal input terminal RST, a first electrode connected to the control terminal of the driving module 191, and a second electrode connected to the first signal input terminal VDD.

In the reset stage, a reset signal is supplied to the reset signal input terminal RST to turn on the reset transistor $T_{rst}$, so that the control terminal of the driving module 191 is also at a level capable of turning on the driving module 191.

FIG. 4 is a circuit diagram of a surface structure identification circuit provided by the present invention, and in FIG. 4, the surface structure identification unit includes a photoelectric sensing element D1, a driving module 191 implemented as a driving transistor, a compensation module 190 implemented as a compensation resistor, a switch control module and a reset module 140.

One terminal of the photoelectric sensing element D1 is connected to a first signal input terminal VDD, and the other terminal thereof is connected to a first electrode of the driving transistor; and a second electrode of the driving transistor is connected to a trace line 110.

A first terminal of the compensation resistor is connected to a second signal input terminal VDD1, and a second terminal thereof is connected to a gate of the driving transistor.

The switch control module includes a first switch transistor T2, a second switch transistor T4 and a third switch transistor T3. The first switch transistor T2 has a gate configured to be connected to one scan line 120, a first electrode connected to the second terminal of the compensation resistor, and a second electrode configured to be connected to the trace line 110. The second switch transistor T4 has a gate connected to one control line EM, a first electrode connected to the first signal input terminal VDD, and a second electrode connected to the first electrode of the driving transistor. The third switch transistor T3 has a gate connected to a pulse signal input terminal $V_{t3}$, a first electrode connected to the trace line 110, and a second electrode connected to the evaluation unit, and the pulse signal input terminal $V_{t3}$ can supply, to the gate of the third switch transistor T3, a voltage signal capable of turning on the third switch transistor T3 in the detecting stage.

The reset module 140 includes a reset transistor $T_{rst}$ and a reset signal input terminal RST, the reset transistor $T_{rst}$ has a gate connected to the reset signal input terminal RST, a first electrode connected to the control terminal (i.e., gate) of the driving transistor, and a second electrode connected to the first signal input terminal VDD.

In the reset stage, the reset signal input terminal RST can supply a reset signal to the gate of the reset transistor $T_{rst}$ to reset the gate of the driving transistor (i.e., reset the voltage of the gate of the driving transistor to a level capable of ensuring that the driving transistor is turned on in the subsequent charging stage).

In the charging stage, an effective signal (i.e., scan signal) is supplied to the gate of the first switch transistor T2 via the scan line 120 to connect the control electrode of the driving transistor to the trace line 110, an invalid signal is supplied to the third switch transistor T3 via the pulse signal input terminal $V_{t3}$ to disconnect the trace line 110 from the evaluation unit, and an invalid signal is supplied to the gate of the second switch transistor T4 via the control line EM to disconnect the first electrode of the driving transistor from the first signal input terminal VDD.

In the detecting stage, an invalid signal is supplied to the gate of the first switch transistor T2 via the scan line 120 to disconnect the control electrode of the driving transistor from the trace line 110, an effective signal is supplied to the third switch transistor T3 via the pulse signal input terminal $V_{t3}$ to connect the trace line 110 to the evaluation unit, and an effective signal is supplied to the gate of the second switch transistor T4 via the control line EM to connect the first electrode of the driving transistor to the first signal input terminal VDD.

As another aspect of the present invention, there is provided a surface structure identification circuit including a plurality of surface structure identification areas arranged in a matrix, wherein the surface structure identification areas in a same column correspond to a same trace line 100, and each surface structure identification area is provided therein with one surface structure identification unit, and the surface structure identification unit is the above surface structure identification unit provided by the present invention.

As described above, in the case that the surface structure identification circuit includes a compensation module 190, the resistance of the compensation module 190 counteracts a part of the internal resistance of the trace line 110, so that influence of the leakage current on the current $I_{out}$ that is ultimately outputted can be reduced, thereby improving accuracy of detection of the surface structure.

In the case that the surface structure identification unit includes a switch control module 130, the surface structure identification circuit further includes a plurality of switch line sets, each row of surface structure identification units correspond to one switch line set, and the switch line set is connected to the switch control module 130 and supplies switch control signals to the switch control module 130, such that:

in the charging stage: the switch control module 130 controls the control terminal of the driving module 191 to be connected to the trace line 110, controls the trace line 110 to be disconnected from the evaluation unit, and controls the first terminal of the driving module to be disconnected from the first signal input terminal VDD; and in the detecting stage: the switch control module 130 controls the control terminal of the driving module 191 to be disconnected from the trace line 110, controls the trace line 110 to be connected to the evaluation unit, and controls the first terminal of the driving module to be connected to the first signal input terminal VDD.

The surface structure identification circuit includes a plurality of surface structure identification areas, each of which is provided therein with the above surface structure identification unit provided by the present invention, therefore, when a user places his/her finger on a surface of the surface structure identification circuit, the plurality of surface structure identification units respectively determine the morphology of the fingerprint covering on upper surfaces thereof (i.e., determine whether a ridge or a valley of the fingerprint covers on the surface structure identification unit), and the pattern of the fingerprint covering on the surface of the surface structure identification circuit can be ultimately determined based on the current outputted from the trace line 110.

As described above, in the case of using the surface structure identification unit to identify the morphology of a surface structure, influence of the leakage current can be reduced or even be eliminated by separating the charging stage from the detecting stage, and thus a more accurate identification result can be obtained.

It could be understood that, the circuit shown in FIG. 4 is only a part of the surface structure identification circuit. To facilitate understanding, FIG. 4 does not show a regular surface structure identification area, elements labeled with reference numerals belong to a same surface structure identification unit and elements without reference numerals belong to other surface structure identification unit(s).

As a specific implementation of the present invention, as shown in FIG. 4, each switch line set includes a scan line 120, a control line EM and a pulse signal line (not shown). Correspondingly, the switch control module includes a first switch transistor T2, a second switch transistor T4 and a third switch transistor T3.

The first switch transistor T2 has a gate connected with the scan line 120, a first electrode connected to the control terminal of the driving module 191, and a second electrode connected to the trace line 110. The scan line 120 may be periodically supplied with a scan signal, so as to turn on the first switch transistor T2 periodically. Specifically, a scan signal is supplied to the scan line 120 in the charging stage of each identification cycle, so as to turn on the first switch transistor T2 in the charging stage to connect the control terminal of the driving module 191 to the trace line 110.

The second switch transistor T4 has a gate connected to the control line EM, a first electrode connected to the first signal input terminal VDD, and a second electrode connected to the first terminal of the driving module. The control line EM may be periodically supplied with a control signal, so as to turn on the second switch transistor T4 periodically. Specifically, a control signal is supplied to the control line EM in the detecting stage of each identification cycle, so as to turn on the second switch transistor T4 in the detecting stage to connect the first terminal of the driving module to the first signal input terminal VDD.

The third switch transistor T3 has a gate connected to a pulse signal input terminal $V_{t3}$, a first electrode connected to the trace line 110, and a second electrode connected to the evaluation unit, and the pulse signal input terminal $V_{t3}$, is connected to the pulse signal line, which is able to supply, to the gate of the third switch transistor T3, a voltage signal capable of turning on the third switch transistor T3 in the detecting stage.

The pulse signal line may be periodically supplied with a pulse signal, so as to turn on the third switch transistor T3 periodically. Specifically, a pulse signal is supplied to the pulse signal line in the detecting stage of each identification cycle, so as to turn on the third switch transistor T3 in the detecting stage to allow the output current generated by the driving module 191 to be outputted to the evaluation unit via the trace line 110.

The surface structure identification unit provided by the present invention further includes the reset module 140 connected to a reset signal line. Correspondingly, each switch line set includes the reset signal line, and the reset module can receive a reset signal via the reset signal line and reset the gate of the driving transistor in the reset stage, so that influence of residual charges in the parasitic capacitance of the driving transistor in a previous identification cycle can be eliminate.

As a preferable implementation of the present invention, the reset module 140 includes a reset transistor $T_{rst}$ and a reset signal input terminal RST, the reset transistor $T_{rst}$ has a gate connected to the reset signal input terminal RST, a first electrode connected to the control terminal of the driving module 191, and a second electrode connected to the first signal input terminal VDD, and the reset signal input terminal RST is connected to the reset signal line.

The reset signal line may be periodically supplied with a reset signal, so as to turn on the reset transistor $T_{rst}$ periodically. Specifically, a reset signal is supplied to the reset signal line in the reset stage of each identification cycle, so as to to turn on the reset transistor $T_{rst}$ in the reset stage.

In order to determine the morphology of the surface structure based on the output current, preferably, the evaluation unit of the surface structure identification circuit may include a plurality of amplifier and filter modules 150 and a plurality of analog to digital (A/D) converters 160, each trace line 110 is connected to one amplifier and filter module 150 corresponding thereto, and each amplifier and filter module 150 is connected to one A/D converter 160 corresponding thereto.

The current outputted from the trace line 110 can be amplified by the amplifier and filter module 150 and be converted to a digital signal by the A/D converter 160, and whether the detected part of a fingerprint is a ridge of the fingerprint or a valley of the fingerprint can be determined according to the magnitude of the digital signal.

As still another aspect of the present invention, there is provided an electronic device including a surface structure identification circuit, wherein the surface structure identification circuit is the above surface structure identification circuit provided by the present invention.

Because the surface structure identification circuit provided by the present invention can accurately identify fingerprints, security of the electronic device is improved.

In the present invention, the specific structure of the electronic device is not particularly limited, for example, the electronic device may be a mobile phone, a notebook computer, a tablet computer or other electronic device.

When the electronic device is a display device, the surface structure identification circuit may be provided in a display area of the electronic device, the surface structure identification units may be combined in pixel units of the electronic device, and the trace lines 110 may be data lines of the display device. When a finger of a user or other surface structure touches the screen, morphology of the surface structure covering on the surface of the screen can be immediately identified.

As still another aspect of the present invention, there is provided a method for identifying a surface structure using the above surface structure identification circuit, wherein the method includes a plurality of identification cycles, and each identification cycle includes:

a reset stage: resetting the control terminal of the driving module 191 by using the reset module 140; a charging stage: controlling the first terminal of the driving module 191 to be disconnected from the first signal input terminal VDD, controlling the second signal input terminal to be set to zero, and controlling the control terminal of the driving module to be connected to the trace line such that the control terminal of the driving module is stabilized at a voltage capable of maintaining connection between the first terminal and the second terminal of the driving module, and meanwhile controlling the trace line 110 to be disconnected from the evaluation unit;

a detecting stage: controlling the trace line 110 to be connected to the evaluation unit, controlling the first terminal of the driving module 191 to be connected to the first signal input terminal VDD; and controlling a signal of the second signal input terminal to make the driving module 191 in amplified state; and a calculating stage: determining, by the evaluation unit, the morphology of the surface structure based on a current received in the detecting stage.

It should be noted that, the resistor $R_{fb}$ shown in FIG. 4 actually is the internal resistance of the lines respectively connecting the compensation resistor to the first switch transistor T2 and the first signal input terminal VDD in series. The photoelectric sensing element D1 may be a photodiode, and an anode of the photoelectric sensing element D1 is connected to the first signal input terminal VDD and a cathode thereof is connected to the first electrode of the driving transistor.

It could be understood that, the above implementations are exemplary implementations merely for explaining the principle of the present invention, but the present invention is not limited thereto. For those of ordinary skill in the art, various variations and improvements can be made without departing from the spirit and scope of the present invention, and these variations and improvements are also considered as falling into the protection scope of the present invention.

What is claimed is:

1. A surface structure identification unit, comprising a photoelectric sensing element, a first signal input terminal, a second signal input terminal, a trace line, a driving module, a reset module and an evaluation unit, wherein:

one terminal of the photoelectric sensing element is connected to the first signal input terminal, and the other terminal thereof is connected to a first terminal of the driving module;

the reset module is configured to be connected to a control terminal of the driving module only in a reset stage to reset potential of the control terminal of the driving module, so as to connect the first terminal of the driving module to a second terminal of the driving module;

the control terminal of the driving module is configured to be respectively connected to the second signal input terminal and the trace line in a charging stage following the reset stage to stabilize the control terminal of the driving module at a voltage capable of maintaining connection between the first terminal and the second terminal of the driving module, and disconnected from the trace line in a detecting stage, wherein the second signal input terminal is set to zero in the charging stage and is supplied with a voltage signal capable of causing the driving module to be in amplified state in the detecting stage; the first terminal of the driving module is configured to be disconnected from the first signal input terminal in the charging stage and connected to the first signal input terminal in the detecting stage; and the second terminal of the driving module is connected to the trace line; and the trace line is configured to be connected to the evaluation unit only in the detecting stage.

2. The surface structure identification unit according to claim 1, wherein the driving module includes a driving transistor, a gate of the driving transistor being formed to be the control terminal of the driving module, a first electrode of the driving transistor being formed to be the first terminal of the driving module, and a second electrode of the driving transistor being formed to be the second terminal of the driving module.

3. The surface structure identification unit according to claim 2, wherein the surface structure identification unit further includes a compensation module having a resistance, a first terminal of the compensation module being connected to the second signal input terminal, and a second terminal of the compensation module being connected to the control terminal of the driving module.

4. The surface structure identification unit according to claim 3, wherein the resistance of the compensation module has the same value as that of an internal resistance of the trace line.

5. The surface structure identification unit according to claim 1, wherein the surface structure identification unit further includes a compensation module having a resistance, a first terminal of the compensation module being connected to the second signal input terminal, and a second terminal of the compensation module being connected to the control terminal of the driving module.

6. The surface structure identification unit according to claim 5, wherein the resistance of the compensation module has the same value as that of an internal resistance of the trace line.

7. The surface structure identification unit according to claim 5, wherein the compensation module is a compensation resistor, which has a resistance having the same value as that of the internal resistance of the trace line.

8. The surface structure identification unit according to claim 7, further including a switch control module, which is configured to:

in the charging stage: control the control terminal of the driving module to be connected to the trace line, control the trace line to be disconnected from the evaluation unit, and control the first terminal of the driving module to be disconnected from the first signal input terminal; and in the detecting stage: control the control terminal of the driving module to be disconnected from the trace line, control the trace line to be connected to the evaluation unit, and control the first terminal of the driving module to be connected to the first signal input terminal.

9. The surface structure identification unit according to claim 8, wherein the switch control module includes a first switch transistor, a second switch transistor and a third switch transistor, wherein:

the first switch transistor has a gate connected to a scan line, a first electrode connected to the control terminal of the driving module, and a second electrode connected to the trace line, the scan line being able to supply an effective signal capable of turning on the first switch transistor to the gate of the first switch transistor in the charging stage;

the second switch transistor has a gate connected to a control line, a first electrode connected to the first signal input terminal, and a second electrode connected to the first terminal of the driving module, the control line being able to supply an effective signal capable of turning on the second switch transistor to the gate of the second switch transistor in the detecting stage; and the third switch transistor has a gate connected to a pulse signal input terminal, a first electrode connected to the trace line, and a second electrode connected to the evaluation unit, the pulse signal input terminal being able to supply an effective signal capable of turning on the third switch transistor to the gate of the third switch transistor in the detecting stage.

10. The surface structure identification unit according to claim 1, further including a switch control module, which is configured to:

in the charging stage: control the control terminal of the driving module to be connected to the trace line, control the trace line to be disconnected from the evaluation unit, and control the first terminal of the driving module to be disconnected from the first signal input terminal; and in the detecting stage: control the control terminal of the driving module to be disconnected from the trace line, control the trace line to be connected to the evaluation unit, and control the first terminal of the driving module to be connected to the first signal input terminal.

11. The surface structure identification unit according to claim 10, wherein the switch control module includes a first switch transistor, a second switch transistor and a third switch transistor, wherein:

the first switch transistor has a gate connected to a scan line, a first electrode connected to the control terminal of the driving module, and a second electrode connected to the trace line, the scan line being able to supply an effective signal capable of turning on the first switch transistor to the gate of the first switch transistor in the charging stage;

the second switch transistor has a gate connected to a control line, a first electrode connected to the first signal input terminal, and a second electrode connected to the first terminal of the driving module, the control line being able to supply an effective signal capable of turning on the second switch transistor to the gate of the second switch transistor in the detecting stage; and the third switch transistor has a gate connected to a pulse signal input terminal, a first electrode connected to the trace line, and a second electrode connected to the evaluation unit, the pulse signal input terminal being able to supply an effective signal capable of turning on the third switch transistor to the gate of the third switch transistor in the detecting stage.

12. The surface structure identification unit according to claim 1, wherein the reset module includes a reset transistor and a reset signal input terminal, the reset transistor having a gate connected to the reset signal input terminal, a first electrode connected to the control terminal of the driving module, and a second electrode connected to the first signal input terminal, and the reset signal input terminal being able to supply an effective signal capable of turning on the reset transistor to the gate of the reset transistor in the reset stage.

13. A surface structure identification circuit, including a plurality of surface structure identification areas arranged in a matrix, one surface structure identification unit being provided in each of the plurality of surface structure identification areas, and surface structure identification units in a same column corresponding to a same trace line, wherein the surface structure identification unit is the surface structure identification unit according to claim 1.

14. The surface structure identification circuit according to claim 13, wherein the surface structure identification circuit further includes a plurality of switch line sets, each surface structure identification unit further includes a switch control module, the surface structure identification units in a same row correspond to a same switch line set, and said switch line set is connected to the switch control modules of the surface structure identification units in said row and supplies switch control signals to the switch control modules, such that:

in the charging stage: the switch control module controls the control terminal of the driving module to be connected to the trace line, controls the trace line to be disconnected from the evaluation unit, and controls the first terminal of the driving module to be disconnected from the first signal input terminal; and in the detecting stage: the switch control module controls the control terminal of the driving module to be disconnected from the trace line, controls the trace line to be connected to the evaluation unit, and controls the first terminal of the driving module to be connected to the first signal input terminal.

15. The surface structure identification circuit according to claim 14, wherein each switch line set includes a scan line, a control line and a pulse signal line, and the switch control module includes a first switch transistor, a second switch transistor and a third switch transistor, wherein:

the first switch transistor has a gate connected to the scan line, a first electrode connected to the control terminal of the driving module, and a second electrode connected to the trace line;

the second switch transistor has a gate connected to the control line, a first electrode connected to the first signal input terminal, and a second electrode connected to the first terminal of the driving module; and the third switch transistor has a gate connected to a pulse signal input terminal, a first electrode connected to the trace line, and a second electrode connected to the evaluation unit, the pulse signal input terminal being connected to the pulse signal line, the pulse signal line being able to supply a voltage signal capable of turning on the third switch transistor to the gate of the third switch transistor in the detecting stage.

16. The surface structure identification circuit according to claim 13, wherein each switch line set includes a reset signal line, the reset module included in the surface structure identification unit is connected to the reset signal line, and the reset module is able to receive a reset signal via the reset signal line in the reset stage and reset the control terminal of the driving module.

17. The surface structure identification circuit according to claim 16, wherein the reset module includes a reset transistor and a reset signal input terminal, the reset transistor having a gate connected to the reset signal input terminal, a first electrode connected to the control terminal of the driving module, and a second electrode connected to the first signal input terminal, and the reset signal input terminal being connected to the reset signal line.

18. The surface structure identification circuit according to claim 13, wherein the evaluation unit includes a plurality of amplifier and filter modules and a plurality of analog to digital converters, each trace line is connected to one amplifier and filter module corresponding thereto, and each amplifier and filter module is connected to one analog to digital converter corresponding thereto.

19. An electronic device, comprising a surface structure identification circuit, wherein the surface structure identification circuit is the surface structure identification circuit according to claim 13.

20. A method for identifying a surface structure using the surface structure identification circuit according to claim 13, wherein the method includes a plurality of identification cycles, and each identification cycle includes:

a reset stage: resetting the control terminal of the driving module using the reset module;

a charging stage: controlling the first terminal of the driving module to be disconnected from the first signal input terminal, controlling the second signal input terminal to be set to zero, controlling the control terminal of the driving module to be connected to the trace line such that the control terminal of the driving module is stabilized at a voltage capable of maintaining connection between the first terminal and the second terminal of the driving module, and controlling the trace line to be disconnected from the evaluation unit;

a detecting stage: controlling the trace line to be connected to the evaluation unit, controlling the first terminal of the driving module to be connected to the first signal input terminal; and controlling a signal of the second signal input terminal to cause the driving module to be in amplified state; and a calculating stage: determining morphology of the surface structure based on a current received in the detecting stage by the evaluation unit.

* * * * *